(12) United States Patent
Tomita et al.

(10) Patent No.: US 7,924,686 B2
(45) Date of Patent: Apr. 12, 2011

(54) OBJECTIVE LENS AND OPTICAL PICKUP DEVICE

(75) Inventors: Takahiro Tomita, Nara (JP); Michihiro Yamagata, Osaka (JP); Yoshiaki Komma, Osaka (JP); Katsuhiko Hayashi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/882,300

(22) Filed: Sep. 15, 2010

(65) Prior Publication Data

US 2011/0002217 A1 Jan. 6, 2011

Related U.S. Application Data

(62) Division of application No. 12/128,255, filed on May 28, 2008, now Pat. No. 7,817,525.

(30) Foreign Application Priority Data

Jan. 23, 2008 (JP) .................................. 2008-012271
Feb. 6, 2008 (JP) .................................. 2008-026196

(51) Int. Cl.
    *G11B 7/135* (2006.01)
(52) U.S. Cl. ................................................. 369/112.23
(58) Field of Classification Search .................. None
    See application file for complete search history.

(56) References Cited

U.S. PATENT DOCUMENTS

| 5,553,052 | A | 9/1996 | Oono et al. |
|---|---|---|---|
| 6,529,465 | B2 | 3/2003 | Kase et al. |
| 7,187,641 | B2 | 3/2007 | Sakamoto |
| 2004/0047049 | A1 | 3/2004 | Ota et al. |
| 2004/0156304 | A1 | 8/2004 | Sakamoto |

FOREIGN PATENT DOCUMENTS

JP 2003-091854 3/2003

OTHER PUBLICATIONS

Co-pending U.S. Appl. No. 12/128,255 filed, May 28, 2008 (allowed claims provided).

*Primary Examiner* — Peter Vincent Agustin
(74) *Attorney, Agent, or Firm* — Renner, Otto, Boisselle & Sklar, LLP

(57) ABSTRACT

An objective lens for converging light onto a recording surface of an optical information recording medium in order to perform at least one of recording, reproduction and deletion of information on the optical information recording medium. The objective lens is a bi-convex single lens having at least one aspheric surface, and satisfies the following conditions: $0.8 < R1/r1 < 0.85$ and $0.9 < d/f < 1.1$. Here, a numerical aperture NA on the optical information recording medium side of the objective lens satisfies $NA \geq 0.85$. R1 is a paraxial curvature radius [mm] on a light source side of the objective lens, r1 is an effective radius [mm] on a light source side of the objective lens, d is a thickness [mm] on the optical axis of the objective lens, and f is a focal length [mm] of the objective lens.

11 Claims, 6 Drawing Sheets

OBJECTIVE LENS AND OPTICAL PICKUP DEVICE

This application is a divisional of U.S. patent application Ser. No. 12/128,255 filed on May 28, 2008, now U.S. Pat. No. 7,817,525, which claims priority to Japanese Application Nos. 2008-012271 filed on Jan. 23, 2008 and 2008-026196 filed on Feb. 6, 2008, and is hereby incorporated herein by reference in its entirety.

BACKGROUND OF THE INVENTION

1. Field of the Invention

The present invention relates to an objective lens used for performing recording, reproduction and deletion of information on an optical information recording medium, and to an optical pickup device employing this objective lens.

2. Description of the Background Art

In the conventional art, optical disk units capable of writing information onto an optical disk such as a CD medium and a DVD medium, reading information from an optical disk, and deleting information recorded on an optical disk are widely used. In such optical disk units, an optical pickup device that includes an objective lens is employed (see, for example, Japanese Laid-Open Patent Publication No. 2003-91854).

In recent years, Blu-ray Disc (registered trademark) employing a blue laser has been developed and has caused the necessity of an objective lens having a remarkably high numerical aperture (NA=0.85). When such an objective lens is to be realized, the thickness of the objective lens need remarkably be increased in general. This causes an increase in the load to the actuator for driving the objective lens. Further, a problem also arises that the high NA causes notable occurrence of off-axial aberration and coma aberration resulting from decentering. Further, in such an objective lens having a remarkably high NA, the inclination angle of the lens surface increases. This causes difficulty in fabrication of a molding die for objective lens manufacturing and in molding of an objective lens.

Thus, an object of the present invention is provide an objective lens in which even in case of a remarkably high NA, thickness reduction and weight reduction are achieved, while satisfactory mass productivity is obtained.

SUMMARY OF THE INVENTION

In order to perform at least one of recording, reproduction and deletion of information on an optical information recording medium, an objective lens according to the present invention is for converging light onto a recording surface of the optical information recording medium. The objective lens is a bi-convex single lens having at least one aspheric surface, and satisfies the following conditions.

$$3.5 < D_{H\text{-}S}/D_{H\text{-}H'} < 4.3 \tag{1}$$

$$3.5 < D_{H'\text{-}T2}/D_{T1\text{-}H} < 50 \tag{2}$$

$$0.9 < d/f < 1.1 \tag{3}$$

(here, a numerical aperture NA on the optical information recording medium side of the objective lens satisfies NA≧0.85)

where, $D_{H\text{-}S}$ is a distance [mm] on the optical axis from a front principal point H of the objective lens to a focal point S on the optical information recording medium side of the objective lens, $D_{H\text{-}H'}$ is a distance [mm] on the optical axis from the front principal point H of the objective lens to a rear principal point H' of the objective lens, $D_{H'\text{-}T2}$ is a distance [mm] on the optical axis from the rear principal point H' of the objective lens to an intersecting point T2 of the optical axis and the optical information recording medium side surface of the objective lens, $D_{T1\text{-}H}$ is a distance [mm] on the optical axis from an intersecting point T1 of the optical axis and a light source side surface of the objective lens to the front principal point H of the objective lens, d is a thickness [mm] on the optical axis of the objective lens, and f is a focal length [mm] of the objective lens.

Alternatively, an objective lens according to the present invention is a bi-convex single lens having at least one aspheric surface, and may satisfy the following condition.

$$0.8 < R1/r1 < 0.85 \tag{4}$$

$$0.9 < d/f < 1.1 \tag{3}$$

(here, a numerical aperture NA on the optical information recording medium side of the objective lens satisfies NA≧0.85)

where,

R1 is a paraxial curvature radius [mm] on a light source side of the objective lens, r1 is an effective radius [mm] on the light source side of the objective lens, d is a thickness [mm] on the optical axis of the objective lens, and f is a focal length [mm] of the objective lens.

Further, an optical pickup device according to the present invention is used for performing at least one of recording, reproduction and deletion of information on an optical information recording medium, and includes a light source and a converging optical system which includes any one of the above-mentioned objective lenses for converging a light beam emitted from the light source onto a recording surface of the optical information recording medium.

According to the present invention, even when the NA is equal to or higher than 0.85, thickness reduction and weight reduction are achieved in an objective lens and its mass productivity is also improved.

These and other objects, features, aspects and effects of the present invention will become further clear from the following detailed description with reference to the accompanying drawings.

DESCRIPTION OF THE PREFERRED EMBODIMENTS

Embodiment 1

Figure 1:
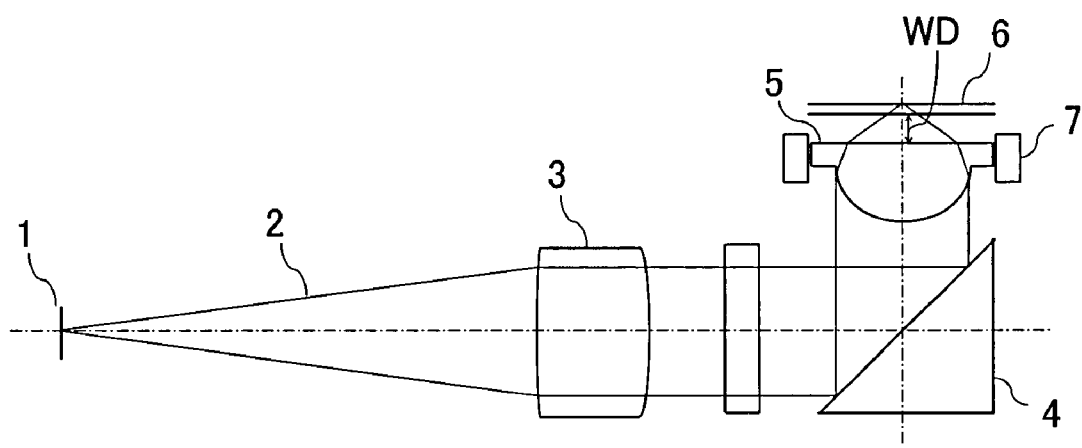
FIG. 1 is a diagram showing a schematic configuration of an optical pickup device according to Embodiment 1 of the present invention.

FIG. 1 is a diagram showing a schematic configuration of an optical pickup device according to Embodiment 1 of the present invention.

An optical pickup device according to Embodiment 1 includes a light source 1, a collimate lens 3, a prism 4, an objective lens 5, and an actuator 7.

The light source 1 is composed, for example, of a semiconductor laser, and emits a light beam 2 having a wavelength in a range of 390 nm to 420 nm. The light beam 2 emitted from the light source 1 is converted into an approximately parallel light beam by the collimate lens 3. The light emitted from the collimate lens 3 is refracted by the prism 4 in a direction perpendicular to the optical axis of the light source 1, and then converged onto the optical information recording medium 6 by the objective lens 5.

The objective lens 5 is coupled to the actuator 7 such that its center axis approximately coincides with the optical axis of the light refracted by the prism 4. Further, the objective lens 5 is movable in a direction perpendicular to the optical axis of the incident light by means of the actuator 7. Thus, even when the wavelength of the laser light varies and thus the light beam becomes divergent or convergent, positional deviation of a spot in the track direction on the optical information recording medium 6 can be corrected, that is, tracking control can be performed.

Figure 2:
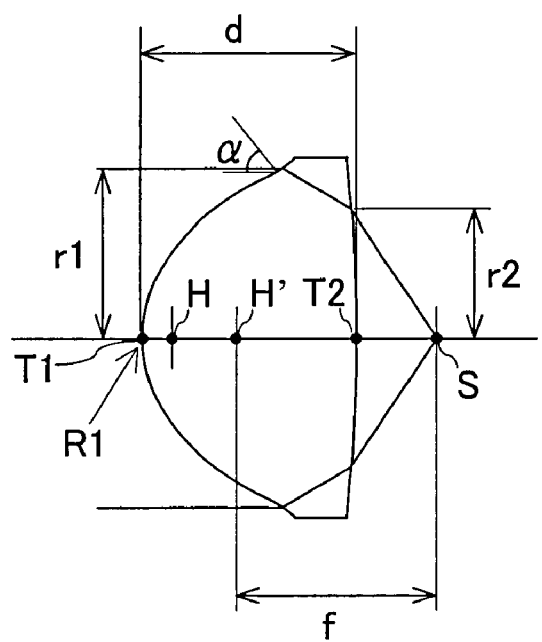
FIG. 2 is an optical path diagram of an objective lens shown in FIG. 1.

FIG. 2 is an optical path diagram of the objective lens 5 shown in FIG. 1. The definitions of the symbols in FIG. 2 are as follows.

S is a focal position on the optical information recording medium side in the case where a parallel light beam enters from the light source side, T1 is an intersecting point of the light source side surface of the objective lens and the optical axis, T2 is an intersecting point of the optical information recording medium side surface of the objective lens and the optical axis, H is a front principal point of the objective lens, H' is a rear principal point of the objective lens, d is a thickness on the optical axis of the objective lens, f is a focal length of the objective lens, R1 is a paraxial curvature radius on the light source side of the objective lens, r1 is an effective radius on the light source side of the objective lens, r2 is an effective radius on the optical information recording medium side of the objective lens, and α is a maximum angle formed between an incident light and a normal line that passes a point on the light source side surface of the objective lens, a height from the optical axis to the point on the light source surface side being equal to or less than the effective radius on the light source side (maximum inclination angle).

The effective radius indicates the radius of the cross section of a light beam that satisfies the NA required for the optical pickup device (0.85 in the case of Blu-ray Disc (registered trademark)).

Hereinafter, conditions that are preferable to be satisfied by the objective lens according to the present embodiment are described. In the following description, a plurality of conditions are set forth. It is most preferable that an objective lens is formed so as to satisfy as many conditions as possible. However, an objective lens which satisfies any one of the following conditions and achieves the effect corresponding to the condition may be obtained.

It is preferable that an objective lens according to the present embodiment satisfies the following conditions simultaneously.

$$3.5 < D_{H-S}/D_{H-H'} < 4.3 \quad (1)$$

$$3.5 < D_{H'-T2}/D_{T1-H} < 50 \quad (2)$$

$$0.9 < d/f < 1.1 \quad (3)$$

(here, a numerical aperture NA on the optical information recording medium side of the objective lens satisfies NA≧0.85)

where, $D_{H-S}$ is a distance [mm] on the optical axis from the front principal point H of the objective lens to the focal point S on the optical information recording medium side of the objective lens, $D_{H-H'}$ is a distance [mm] on the optical axis from the front principal point H of the objective lens to the rear principal point H' of the objective lens, $D_{H'-T2}$ is a distance [mm] on the optical axis from the rear principal point H' of the objective lens to the intersecting point T2 of the optical axis and the optical information recording medium side surface of the objective lens, and $D_{T1-H}$ is a distance [mm] on the optical axis from the intersecting point T1 of the optical axis and the light source side surface of the objective lens to the front principal point H of the objective lens.

When the conditions (1) to (3) are satisfied, even in the case where an objective lens has a high NA, the objective lens can be made thin and a required working distance is ensured. Further, the occurrence of off-axial aberration and coma aberration resulting from decentering and the like can be suppressed. In contrast, when each value falls outside the ranges of conditions (1) to (3), it is difficult to simultaneously achieve reduction in thickness and weight of the objective lens and the suppression of aberration.

Further, it is preferable that an objective lens according to the present embodiment satisfies the following conditions simultaneously, in place of the above-mentioned conditions (1) to (3), or in addition to the above-mentioned conditions (1) to (3).

$$0.8 < R1/r1 < 0.85 \quad (4)$$

$$0.9 < d/f < 1.1 \quad (3)$$

(here, a numerical aperture NA on the optical information recording medium side of the objective lens satisfies NA≧0.85)

When the conditions (3) and (4) are satisfied, even in the case where the objective lens has a high NA, thickness and weight of the objective lens can be reduced and degradation in the converging characteristics, caused by the occurrence of off-axial aberration and coma aberration resulting from decentering, can be suppressed. When R1/r1 is smaller than 0.8, the maximum inclination angle α becomes excessively large, whereby causing notable difficulty in fabrication of a molding die and in molding of the lens. Further, when R1/r1 is greater than 0.85, the occurrence of coma aberration resulting from decentering is increased.

Further, it is preferable that the objective lens according to the present embodiment satisfies the following condition.

$$0.75 < r2/r1 < 0.8 \qquad (5)$$

When r2/r1 is set to be greater than 0.75, concentration of light energy on the medium side surface of the objective lens can be reduced. Thus, even when light having high energy enters the objective lens, rise in temperature can be minimized, thereby reducing degradation in the optical characteristics caused by the rise in temperature.

As material for forming the objective lens, plastic resin or glass is used. The above-mentioned merit in that the concentration of light energy can be reduced is advantageous especially in the case where plastic is employed. Specifically, when light having a wavelength of approximately 400 nm is used, for example, in the case of Blu-ray Disc (registered trademark), the plastic material may be decomposed owing to the concentration of light energy onto the objective lens. However, when r2/r1 is set to be greater than 0.75 in accordance with the condition (5), the concentration of light energy can be reduced so that reliability and durability of the objective lens can be improved.

When the light energy is highly concentrated, the rise in temperature of the objective lens becomes greater regardless of the material of the objective lens, thereby leading to a problem of deviation of the focal position. However, according to the condition (5), the concentration of light energy can be reduced, whereby stability in the light converging performance can be ensured.

Here, when r2/r1 is equal to or smaller than 0.75, the effect of reducing the concentration of light energy cannot be satisfactorily obtained. In contrast, when r2/r1 is equal to or greater than 0.8, the occurrence of coma aberration with respect to the decentering at the time of molding is increased.

Further, it is preferred that the objective lens according to the present embodiment satisfies the following condition.

$$60° < \alpha < 65° \qquad (6)$$

When the condition (6) is satisfied, a practical design of the objective lens, fabrication of a molding die, and molding using the molding die can be actually performed, thereby improving the mass productivity. In contrast, when the maximum inclination angle α falls outside the range of the condition (6), difficulty arises in the fabrication of a molding die and in the molding.

Further, it is preferred that the objective lens according to the present embodiment satisfies the following condition.

$$WD/(d+2 \times r1) \geqq 0.12 \qquad (7)$$

where,

WD is a working distance of the objective lens (that is, a distance from the optical information recording medium side surface of the objective lens to the surface of the optical information recording medium).

As shown in FIG. 1, in order that the height (horizontal dimension in FIG. 1) of the optical pickup device should be reduced, the optical path is bent at a right angle by using the prism 4. In this case, the height of the optical pickup device is restricted by the sum of the thickness of the objective lens 5 and the height of the prism surface necessary for refracting the light beam (whose diameter is equal to the effective diameter on the light source side of the objective lens) incident on the objective lens 5, that is, by the sum (d+2×r1) of the thickness d and the effective diameter (2×r1) on the light source side. When compatibility is desired for optical disks of different standards (e.g., the compatibility between CD/DVD), the working distance WD, that is, the clearance between the objective lens 5 and the optical disk surface, need be increased. However, when WD is increased, the effective radius r2 on the optical information recording medium side increases. When r2 is increased, r1 also increases, thereby inviting an increase in the height of the optical pickup device.

Thus, with adopting WD/(d+2×r1) as an index, when an objective lens is formed in such a manner that the numerical value of the index should become greater, contribution can be made for height reduction in the optical pickup device. Specifically, as shown in the condition (7), it is preferable that the value WD/(d+2×r1) is equal to or greater than 0.12. Moreover, in order to further reduce the height of the optical pickup device, it is preferable that WD/(d+2×r1) is equal to or greater than 0.14. In contrast, when the value WD/(d+2×r1) is smaller than 0.12, merely small contribution can be made for height reduction in the optical pickup device.

Embodiment 2

Figure 3:
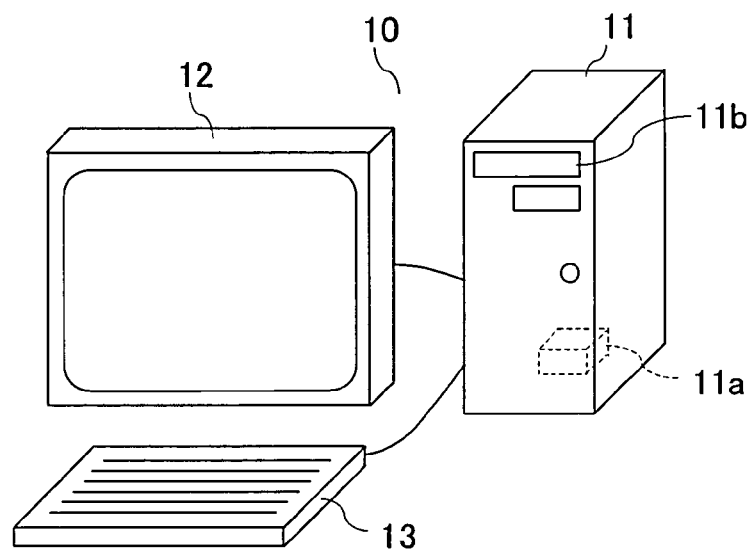
FIG. 3 is a diagram showing a schematic configuration of a computer system according to Embodiment 2 of the present invention.

FIG. 3 is a diagram showing a schematic configuration of a computer system according to Embodiment 2 of the present invention.

A computer system 10 includes a main body 11, a liquid crystal display 12 serving as an output device, and a keyboard 13 serving as an input device. Further, the main body 11 includes a CPU 11a and an optical disk drive 11b.

Figure 4:
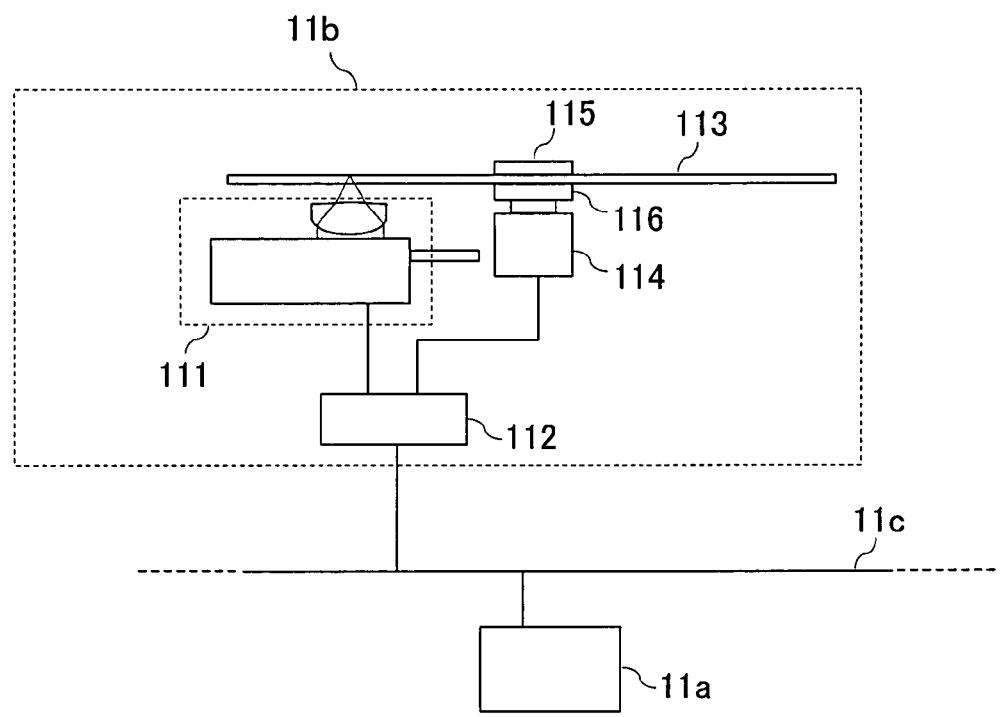
FIG. 4 is a block diagram showing a schematic configuration of an optical disk drive shown in FIG. 3.
Figure 5:
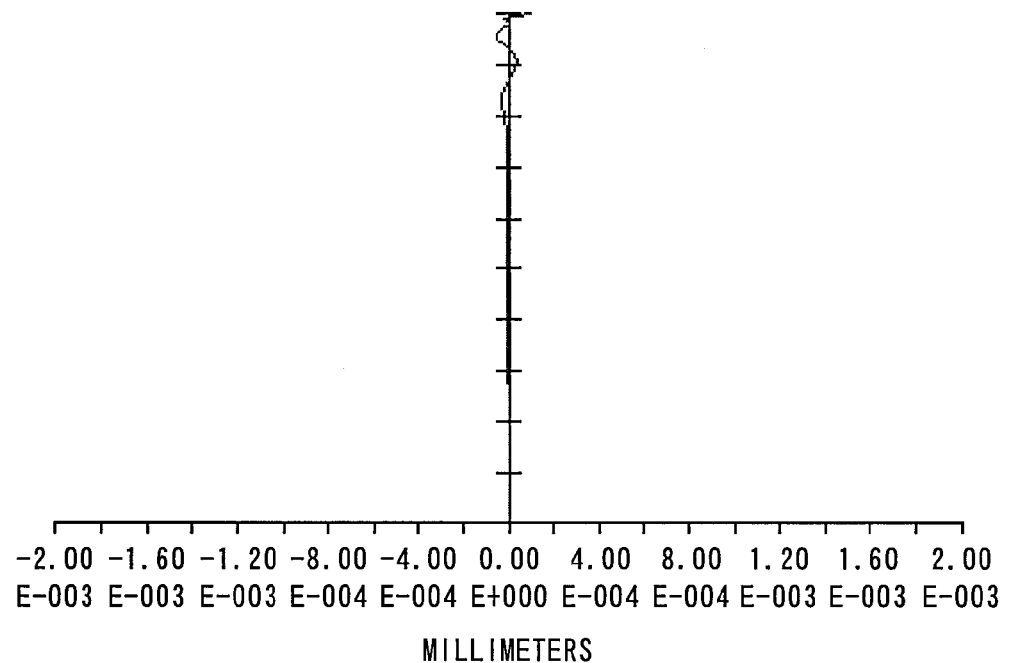
FIG. 5 is a longitudinal aberration diagram of an objective lens according to Numerical Example 1.
Figure 6:
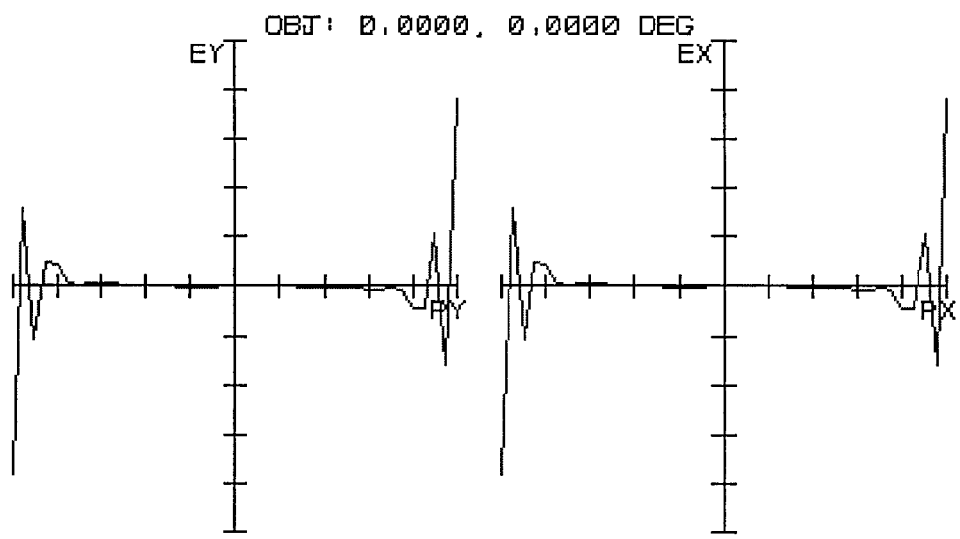
FIG. 6 is a lateral aberration diagram of an objective lens according to Numerical Example 1.
Figure 7:
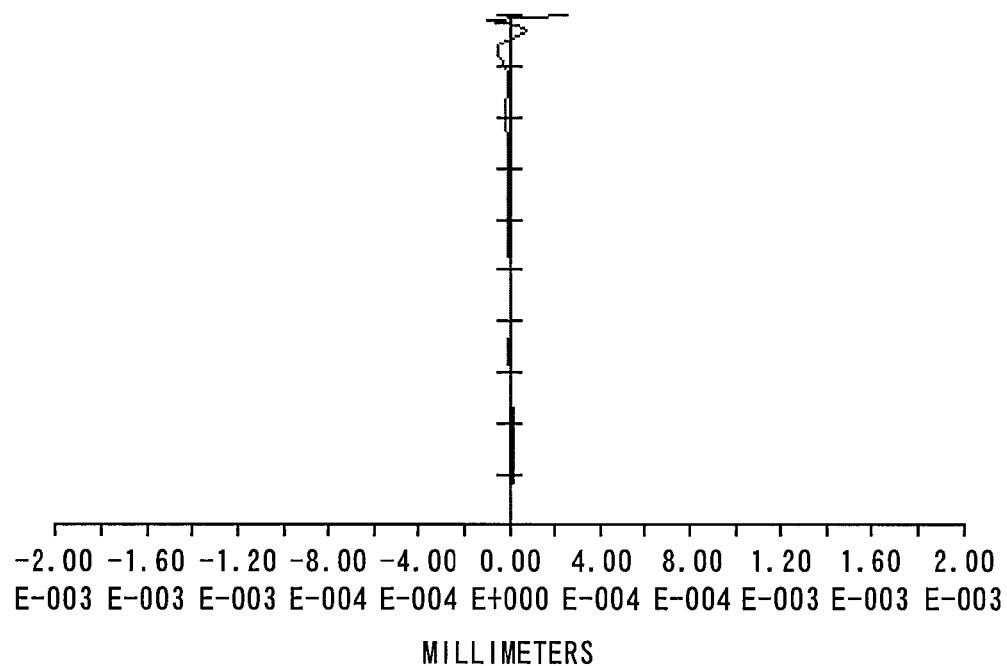
FIG. 7 is a longitudinal aberration diagram of an objective lens according to Numerical Example 2.
Figure 8:
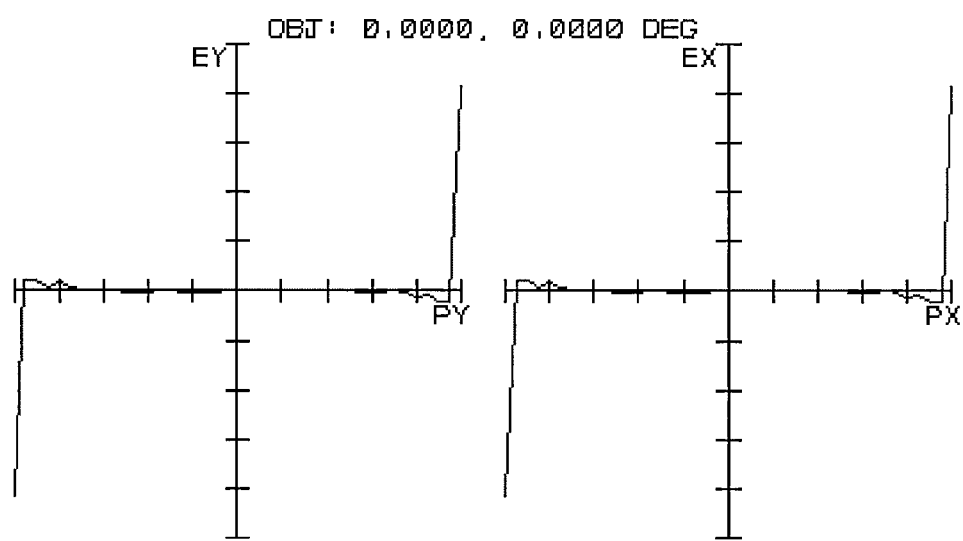
FIG. 8 is a lateral aberration diagram of an objective lens according to Numerical Example 2.
Figure 9:
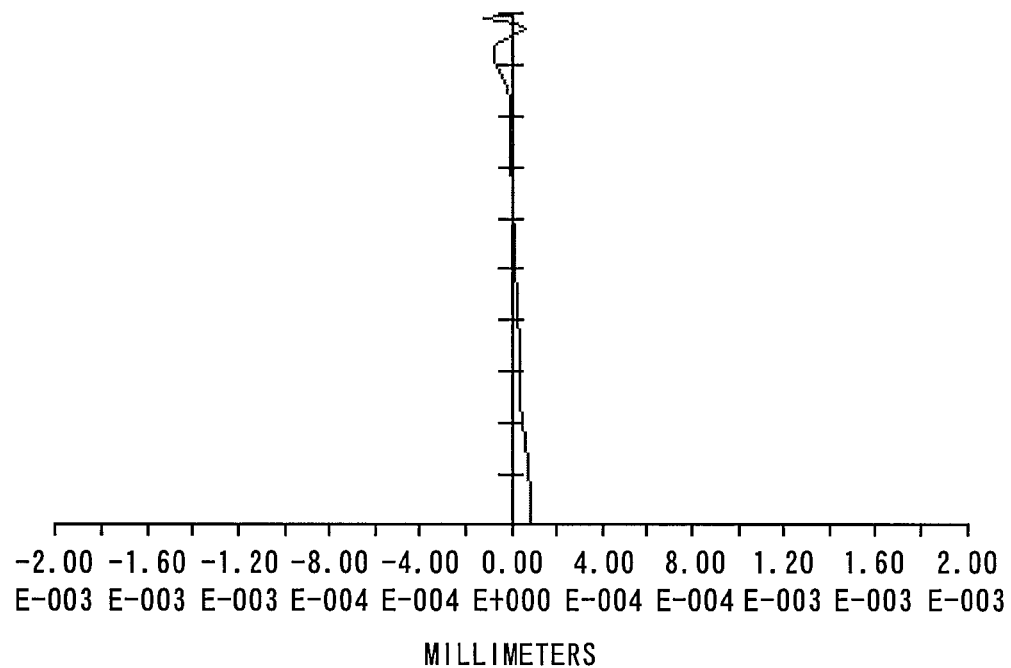
FIG. 9 is a longitudinal aberration diagram of an objective lens according to Numerical Example 3.
Figure 10:
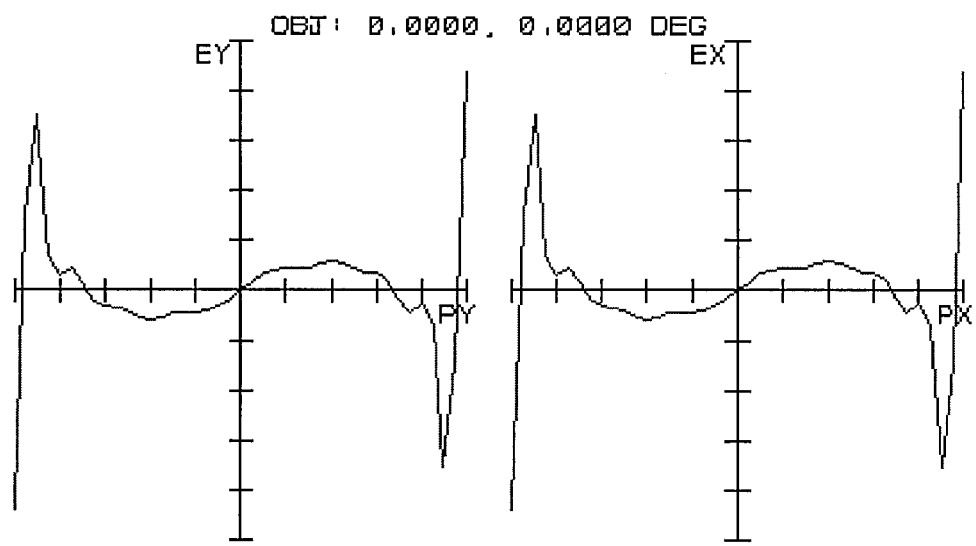
FIG. 10 is a lateral aberration diagram of an objective lens according to Numerical Example 3.
Figure 11:
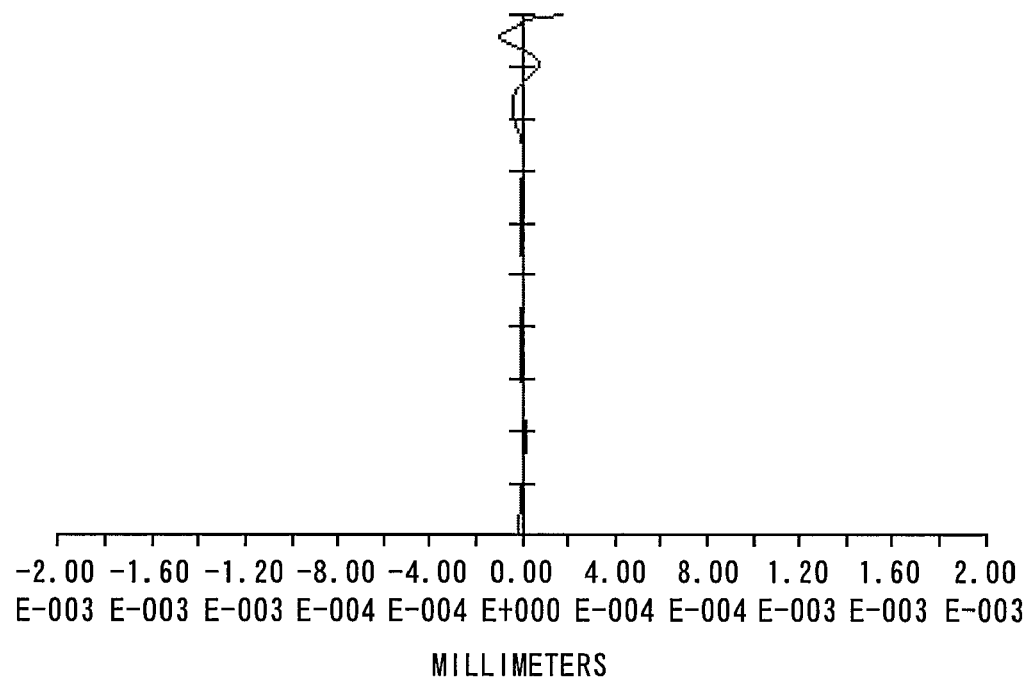
FIG. 11 is a longitudinal aberration diagram of an objective lens according to Numerical Example 4.
Figure 12:
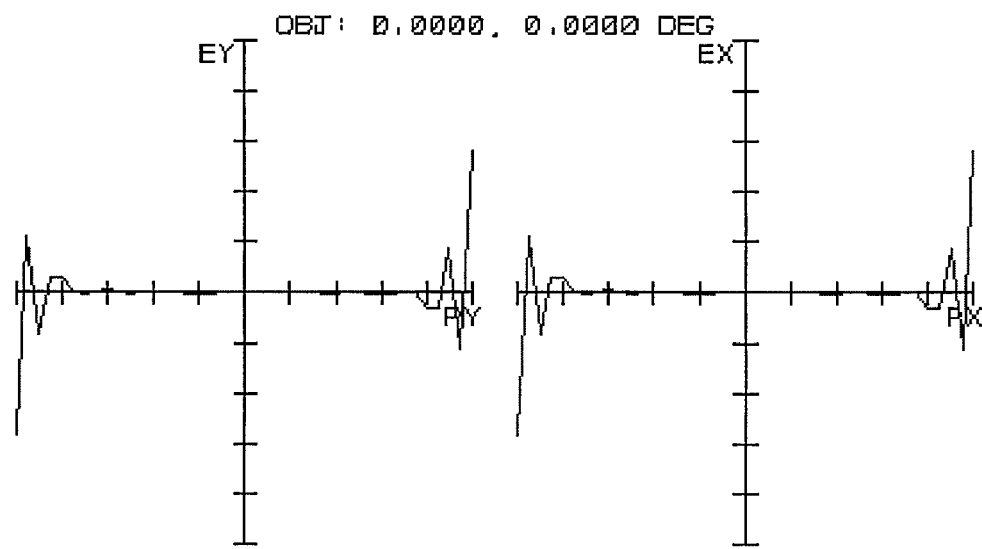
FIG. 12 is a lateral aberration diagram of an objective lens according to Numerical Example 4.

FIG. 4 is a block diagram showing a schematic configuration of the optical disk drive 11b shown in FIG. 3.

The optical disk drive 11b includes an optical pickup device 111 according to Embodiment 1, an interface 112, a motor 114, a turntable 116, and a clamper 115. In FIG. 4, an optical disk 113 is placed on the turntable 116. The interface 112 of the optical disk drive 11b is connected through a signal line 11c to the CPU 11a.

The CPU 11a transmits various control signals through the interface 112 to the optical pickup device 111 and the motor 114. In accordance with the control signal, the motor 114 drives and revolves the optical disk 113 fixed on the turntable 116 by the clamper 115. On the other hand, in accordance with the various control signals from the CPU 11a, the optical pickup device 111 performs read, write and deletion of data on the recording layer of the optical disk 113.

The optical disk drive 11b constituting the computer system 10 according to Embodiment 2 employs an optical pickup device 111 described in Embodiment 1. Thus, in comparison with a conventional optical disk drive, the size is reduced in the optical disk drive 11b in the optical axis direction of the objective lens. Accordingly, the computer system 10 can be constructed compactly.

Here, Embodiment 2 has been described for an exemplary case of an optical disk drive included in a computer system. However, the objective lens and the optical pickup device according to Embodiment 1 are applicable to an arbitrary information system that stores information, such as an optical disk player, an optical disk recorder, a car navigation system, an authoring system, a data server, an AV component, and a vehicle.

NUMERICAL EXAMPLE

Numerical examples in which the objective lens according to Embodiment 1 was implemented practically are described below. In the numerical examples, the units of lengths relevant to the dimensions of the lens in respective tables are all "mm". Further, in the numerical examples, the aspheric surface shape is defined by the following formula.

$$X = \frac{C_j h^2}{1 + \sqrt{1 - (1 + K_j)C_j^2 h^2}} + \sum A_{j,n} h^n$$

Here, the meaning of each symbol is as follows.

h is a height from the optical axis,

X is a distance from a point on the aspheric surface whose height from the optical axis is h to the tangential plane at the aspheric surface vertex, $C_j$ is a curvature at the aspheric surface vertex of the j-th surface of the objective lens ($C_j=1/R_j$ when the curvature radius at the aspheric surface vertex of the j-th surface of the objective lens is denoted by $R_j$), $K_j$ is the conic constant of the j-th surface of the objective lens, and $A_{j,n}$ is the n-th aspherical coefficient of the j-th surface of the objective lens.

Table 1 shows the lens data of the objective lens according to Numerical Examples 1 to 4 and the values corresponding to the individual conditions. In Table 1, λ indicates a design wave length, while n indicates the refractive index of the lens material with respect to light having the design wave length λ.

TABLE 1

(lens data and values corresponding to individual conditions)

| | | NUMERICAL EXAMPLE 1 | NUMERICAL EXAMPLE 2 | NUMERICAL EXAMPLE 3 | NUMERICAL EXAMPLE 4 |
|---|---|---|---|---|---|
| | NA | 0.85 | 0.85 | 0.85 | 0.85 |
| | λ (nm) | 405 | 405 | 405 | 405 |
| | n | 1.6234 | 1.7097 | 1.7097 | 1.6234 |
| | f (mm) | 1.408 | 1.765 | 2.5 | 1.408 |
| | d (mm) | 1.54 | 1.66 | 2.45 | 1.45 |
| | $D_{H-S}$ (mm) | 1.854 | 2.439 | 3.488 | 1.854 |
| | $D_{H-H}$ (mm) | 0.446 | 0.674 | 0.988 | 0.447 |
| | $D_{H-T2}$ (mm) | 0.853 | 0.929 | 1.409 | 0.812 |
| | $D_{T1-H}$ (mm) | 0.241 | 0.027 | 0.053 | 0.191 |
| | R1 (mm) | 0.976 | 0.1268 | 1.803 | 0.966 |
| | r1 (mm) | 1.2 | 1.5 | 2.125 | 1.2 |
| | r2 (mm) | 0.904 | 1.191 | 1.631 | 0.914 |
| | WD (mm) | 0.5 | 0.7521 | 1.0367 | 0.5423 |
| (1) | $D_{H-S}/D_{H-H}$ | 4.157 | 3.619 | 3.53 | 4.148 |
| (2) | $D_{H-T2}/D_{T1-H}$ | 3.539 | 34.407 | 26.585 | 4.251 |
| (3) | d/f | 1.094 | 0.941 | 0.98 | 1.03 |
| (4) | R1/r1 | 0.814 | 0.845 | 0.848 | 0.805 |
| (5) | r2/r1 | 0.753 | 0.794 | 0.768 | 0.761 |
| (6) | α (°) | 62.3 | 61.3 | 60.9 | 63.5 |
| (7) | WD/(d + 2 × r1) | 0.127 | 0.161 | 0.155 | 0.141 |

Tables 2 to 5 show the aspherical data of the objective lens according to Numerical Examples 1 to 4.

TABLE 2

(Numerical Example 1)

| | LIGHT SOURCE SIDE SURFACE (1ST SURFACE) | OPTICAL INFORMATION RECORDING MEDIUM SIDE SURFACE (2ND SURFACE) |
|---|---|---|
| R | 0.976456 | −3.453415 |
| K | −0.9759662 | −142.4346 |
| A4 | 0.072677311 | 0.23396804 |

TABLE 2-continued (Numerical Example 1)

| | LIGHT SOURCE SIDE SURFACE (1ST SURFACE) | OPTICAL INFORMATION RECORDING MEDIUM SIDE SURFACE (2ND SURFACE) |
|---|---|---|
| A6 | 0.019913925 | −0.60371079 |
| A8 | −0.003280565 | 1.3104318 |
| A10 | 0.037635639 | −2.3369295 |
| A12 | −0.07947901 | 2.6070762 |
| A14 | 0.11397914 | −1.5876507 |
| A16 | −0.10277546 | 0.40283933 |
| A18 | 0.05421167 | — |
| A20 | −0.013127114 | — |

TABLE 3

(Numerical Example 2)

| | LIGHT SOURCE SIDE SURFACE (1ST SURFACE) | OPTICAL INFORMATION RECORDING MEDIUM SIDE SURFACE (2ND SURFACE) |
|---|---|---|
| R | 1.267711 | −44.8376 |
| K | −0.9781575 | −26795.78 |
| A4 | 0.035822796 | 0.1082869 |
| A6 | 0.0055122 | −0.18078275 |
| A8 | −8.89971E−05 | 0.27333919 |
| A10 | 0.004397701 | −0.3028286 |

TABLE 3-continued (Numerical Example 2)

| | LIGHT SOURCE SIDE SURFACE (1ST SURFACE) | OPTICAL INFORMATION RECORDING MEDIUM SIDE SURFACE (2ND SURFACE) |
|---|---|---|
| A12 | −0.006375722 | 0.19845835 |
| A14 | 0.005824615 | −0.069928387 |
| A16 | −0.003192219 | 0.010235832 |
| A18 | 0.001020656 | — |
| A20 | −0.00015437 | — |

TABLE 4

(Numerical Example 3)

| | LIGHT SOURCE SIDE SURFACE (1ST SURFACE) | OPTICAL INFORMATION RECORDING MEDIUM SIDE SURFACE (2ND SURFACE) |
|---|---|---|
| R | 1.802685 | −47.52278 |
| K | −0.9563194 | −14670.65 |
| A4 | 0.011955319 | 0.04105487 |
| A6 | 0.00084973 | −0.035017292 |
| A8 | 0.00013211 | 0.02486749 |
| A10 | 6.95402E−05 | −0.013311584 |
| A12 | −8.33011E−05 | 0.004353366 |
| A14 | 4.90683E−05 | −0.000781434 |
| A16 | −1.57705E−05 | 5.90785E−05 |
| A18 | 2.75935E−06 | — |
| A20 | −2.13751E−07 | — |

TABLE 5

(Numerical Example 4)

| | LIGHT SOURCE SIDE SURFACE (1ST SURFACE) | OPTICAL INFORMATION RECORDING MEDIUM SIDE SURFACE (2ND SURFACE) |
|---|---|---|
| R | 0.966362 | −4.095634 |
| K | −0.97261 | −155.7852 |
| A4 | 0.074242747 | 0.23736105 |
| A6 | 0.023283506 | −0.63818663 |
| A8 | −0.009256113 | 1.4606853 |
| A10 | 0.051302282 | −2.4381089 |
| A12 | −0.09490531 | 2.4382605 |
| A14 | 0.12268312 | −1.1315584 |
| A16 | −0.10387775 | 0.29465413 |
| A18 | 0.05455745 | — |
| A20 | −0.013600226 | — |

FIGS. 5, 7, 9 and 11 are longitudinal aberration diagrams of the objective lenses according to Numerical Examples 1, 2, 3 and 4, respectively. Further, FIGS. 6, 8, 10 and 12 are lateral aberration diagrams of the objective lenses according to Numerical Examples 1, 2, 3 and 4, respectively.

As described above, each objective lens according to Numerical Examples 1 to 4 is designed such as to satisfy the above-mentioned condition formulas. Thus, according to the present invention, even in the case where NA is remarkably high, thickness and weight of the objective lens can be reduced and mass productivity can be improved. Moreover, according to the present invention, the occurrence of off-axial aberration and coma aberration resulting from decentering can be suppressed.

The present invention has been described above in detail. However, the description given above is merely illustrative examples of the present invention from all points of view, and does not limit the scope of the present invention. It cannot be overemphasized that various improvements and modifications can be made without deviating from the scope of the present invention.

What is claimed is:

1. An objective lens for converging light onto a recording surface of an optical information recording medium in order to perform at least one of recording, reproduction and deletion of information on the optical information recording medium, wherein
    the objective lens is a bi-convex single lens having at least one aspheric surface, and satisfies the following conditions:

$$0.8 < R1/r1 < 0.85 \quad (4)$$

$$0.9 < d/f < 1.1 \quad (3)$$

(here, a numerical aperture NA on the optical information recording medium side of the objective lens satisfies NA≧0.85)
where,
R1 is a paraxial curvature radius [mm] on a light source side of the objective lens,
r1 is an effective radius [mm] on a light source side of the objective lens,
d is a thickness [mm] on the optical axis of the objective lens, and
f is a focal length [mm] of the objective lens.

2. The objective lens as claimed in claim 1, satisfying the following condition:

$$0.75 < r2/r1 < 0.8 \quad (5)$$

where,
r1 is an effective radius [mm] on the light source side of the objective lens, and
r2 is an effective radius [mm] on the optical information recording medium side of the objective lens.

3. The objective lens as claimed in claim 2, wherein the objective lens is formed from a plastic material.

4. The objective lens as claimed in claim 1, wherein the objective lens is formed from a glass material.

5. The objective lens as claimed in claim 1, satisfying the following condition:

$$60° < \alpha < 65° \quad (6)$$

where,
α is a maximum angle formed between an incident light and a normal line that passes a point on the light source side surface of the objective lens, a height from the optical axis to the point on the light source surface side being equal to or less than the effective radius on the light source side.

6. An optical pickup device for performing at least one of recording, reproduction and deletion of information on an optical information recording medium, comprising:
    a light source; and
    a converging optical system which includes an objective lens for converging a light beam emitted from the light source onto a recording surface of the optical information recording medium, wherein
    the objective lens is a bi-convex single lens having at least one aspheric surface, and satisfies the following conditions:

$$0.8 < R1/r1 < 0.85 \quad (4)$$

$$0.9 < d/f < 1.1 \quad (3)$$

(here, a numerical aperture NA on the optical information recording medium side of the objective lens satisfies NA≧0.85)
where,
R1 is a paraxial curvature radius [mm] on a light source side of the objective lens,
r1 is an effective radius [mm] on the light source side of the objective lens,
d is a thickness [mm] on the optical axis of the objective lens, and
f is a focal length [mm] of the objective lens.

7. The optical pickup device as claimed in claim 6, wherein the objective lens satisfies the following condition:

$$0.75 < r2/r1 < 0.8 \quad (5)$$

where, r1 is an effective radius [mm] on the light source side of the objective lens, and r2 is an effective radius [mm] on the optical information recording medium side of the objective lens.

8. The optical pickup device as claimed in claim 7, wherein the objective lens is formed from a plastic material.

9. The optical pickup device as claimed in claim 6, wherein the objective lens is formed from a glass material.

10. The optical pickup device as claimed in claim 6, wherein the objective lens satisfies the following condition:

$$60° < \alpha < 65° \qquad (6)$$

where,

α is a maximum angle formed between an incident light and a normal line that passes a point on the light source side surface of the objective lens, a height from the optical axis to the point on the light source surface side being equal to or less than the effective radius on the light source side.

11. The optical pickup device as claimed in claim 6, satisfying the following condition:

$$WD/(d+2×r1) \geqq 0.12 \qquad (7)$$

where,

WD is a distance [mm] from an optical information recording medium side surface of the objective lens to a surface of the optical information recording medium surface, d is a thickness [mm] on the optical axis of the objective lens, and r1 is the effective radius [mm] on the light source side of the objective lens.

* * * * *